US012432781B2

(12) United States Patent  
Tang et al.

(10) Patent No.: US 12,432,781 B2  
(45) Date of Patent: Sep. 30, 2025

(54) HANDOVER IN DUAL CONNECTIVITY TO A PRIMARY BASE STATION AND A SECONDARY BASE STATION

(71) Applicant: Apple Inc., Cupertino, CA (US)

(72) Inventors: Yang Tang, Santa Clara, CA (US); Qiming Li, Beijing (CN); Manasa Raghavan, Sunnyvale, CA (US); Xiang Chen, Campbell, CA (US); Huaning Niu, San Jose, CA (US); Dawei Zhang, Saratoga, CA (US); Hong He, San Jose, CA (US); Fangli Xu, Beijing (CN); Yushu Zhang, Beijing (CN); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,248

(22) PCT Filed: Apr. 1, 2021

(86) PCT No.: PCT/CN2021/084971  
§ 371 (c)(1),  
(2) Date: Sep. 20, 2021

(87) PCT Pub. No.: WO2022/205321  
PCT Pub. Date: Oct. 6, 2022

(65) Prior Publication Data  
US 2024/0049068 A1    Feb. 8, 2024

(51) Int. Cl.  
*H04W 36/00* (2009.01)  
*H04W 36/08* (2009.01)  
(Continued)

(52) U.S. Cl.  
CPC . *H04W 74/0833* (2013.01); *H04W 36/00698* (2023.05); *H04W 36/08* (2013.01); *H04W 36/249* (2023.05)

(58) Field of Classification Search  
None  
See application file for complete search history.

(56) References Cited

U.S. PATENT DOCUMENTS

| 9,451,609 B2 | 9/2016 | Fukuta et al. |
| 10,085,189 B2 | 9/2018 | Mitsui et al. |

(Continued)

FOREIGN PATENT DOCUMENTS

| CN | 107925931 A | * | 4/2018 | ............ H04W 16/32 |
| CN | 111328118 A |   | 6/2020 | |

(Continued)

OTHER PUBLICATIONS

Apple, "On RRM requirement for handover with PSCell", 3GPP TSG-RAN4 Meeting #98-e, R4-2100193, Feb. 5, 2021 (Feb. 5, 2021).

(Continued)

*Primary Examiner* — Andrew C Oh  
(74) *Attorney, Agent, or Firm* — Sterne, Kessler, Goldstein &Fox P.L.L.C.

(57) ABSTRACT

Some aspects of this disclosure relate to apparatuses and methods for implementing techniques for a user equipment (UE) having dual connectivity. The UE can communicate with a first primary base station in a first primary cell (PCell) and a second primary base station in a second PCell. The UE has dual connectivity in the second PCell using a first wireless carrier to communicate with the second primary base station and a second wireless carrier to communicate with a secondary base station in a primary secondary cell (PSCell). The UE receives a message from the first primary base station to perform a handover procedure. The UE performs the handover procedure according to the received message, and further perform an addition procedure for the secondary base station in parallel with the handover proce- (Continued)

dure. A start time of the addition procedure can be before an end time of the handover procedure.

16 Claims, 8 Drawing Sheets

(51) Int. Cl.
*H04W 36/24* (2009.01)
*H04W 74/0833* (2024.01)

(56) References Cited

U.S. PATENT DOCUMENTS

| | | | | |
|---|---|---|---|---|
| 2009/0239539 | A1* | 9/2009 | Zhang | H04W 36/0064 455/436 |
| 2009/0310560 | A1* | 12/2009 | Gandham | H04W 36/0085 370/352 |
| 2015/0009880 | A1* | 1/2015 | Zhang | H04L 5/0035 370/332 |
| 2015/0023319 | A1* | 1/2015 | Park | H04W 36/0064 370/331 |
| 2015/0043492 | A1* | 2/2015 | Baek | H04W 56/0005 370/329 |
| 2015/0111580 | A1* | 4/2015 | Wu | H04W 36/0038 455/436 |
| 2016/0226612 | A1* | 8/2016 | Axmon | H04J 11/0086 |
| 2016/0323917 | A1* | 11/2016 | Hwang | H04W 4/70 |
| 2016/0345364 | A1* | 11/2016 | Uchino | H04L 1/0046 |
| 2017/0086254 | A1* | 3/2017 | Lee | H04W 72/21 |
| 2017/0164247 | A1* | 6/2017 | Wiemann | H04W 48/12 |
| 2017/0245181 | A1* | 8/2017 | Zhang | H04W 36/08 |
| 2017/0245199 | A1* | 8/2017 | Lee | H04W 48/02 |
| 2018/0035469 | A1* | 2/2018 | Chen | H04W 74/002 |
| 2018/0049082 | A1* | 2/2018 | Kinthada Venkata | H04W 36/302 |
| 2018/0213450 | A1 | 7/2018 | Futaki et al. | |
| 2018/0220344 | A1* | 8/2018 | Shaheen | H04W 4/60 |
| 2018/0343595 | A1* | 11/2018 | da Silva | H04J 11/0073 |
| 2019/0037458 | A1* | 1/2019 | Kadiri | H04W 76/20 |
| 2019/0037635 | A1* | 1/2019 | Guo | H04W 76/27 |
| 2019/0215862 | A1* | 7/2019 | Kim | H04W 74/006 |
| 2019/0297537 | A1* | 9/2019 | Tsai | H04W 36/0077 |
| 2019/0349822 | A1* | 11/2019 | Kim | H04W 36/08 |
| 2020/0145888 | A1* | 5/2020 | Paladugu | H04W 80/02 |
| 2020/0154375 | A1* | 5/2020 | Wang | H04W 52/242 |
| 2020/0205050 | A1* | 6/2020 | Shah | H04W 74/0833 |
| 2020/0296635 | A1* | 9/2020 | Rastegardoost | H04W 36/0064 |
| 2020/0314913 | A1* | 10/2020 | Rastegardoost | H04W 36/0064 |
| 2020/0314914 | A1* | 10/2020 | Roy | H04B 7/18523 |
| 2021/0105673 | A1* | 4/2021 | Jassal | H04W 36/185 |
| 2021/0160711 | A1* | 5/2021 | Chen | H04W 24/10 |
| 2021/0211956 | A1* | 7/2021 | Kim | H04W 12/043 |
| 2021/0314826 | A1* | 10/2021 | Chang | H04W 36/305 |
| 2021/0385897 | A1* | 12/2021 | Purkayastha | H04W 36/087 |
| 2021/0400760 | A1 | 12/2021 | Yang | |
| 2022/0141875 | A1* | 5/2022 | Berliner | H04W 74/002 370/329 |
| 2022/0248286 | A1* | 8/2022 | Sedin | H04W 74/0833 |
| 2023/0060537 | A1* | 3/2023 | Da Silva | H04W 36/00837 |
| 2023/0180075 | A1* | 6/2023 | Cui | H04W 36/00698 370/331 |

FOREIGN PATENT DOCUMENTS

| | | | | |
|---|---|---|---|---|
| EP | 2943007 | A1 * | 11/2015 | H04W 36/0069 |
| WO | WO-2009096195 | A1 * | 8/2009 | H04W 28/0268 |
| WO | WO 2014/163143 | A1 | 10/2014 | |
| WO | WO 2016/163544 | A1 | 10/2016 | |
| WO | WO-2016188360 | A1 * | 12/2016 | H04W 12/06 |
| WO | WO-2017022166 | A1 * | 2/2017 | H04W 16/32 |
| WO | WO-2017022167 | A1 * | 2/2017 | H04W 16/32 |
| WO | WO-2017130852 | A1 * | 8/2017 | H04J 11/00 |
| WO | WO 2021/051357 | A1 | 3/2021 | |
| WO | WO 2022/155302 | A2 | 7/2022 | |

OTHER PUBLICATIONS

Apple et al., "WF on further RRM enhancement for NR and MR-DC—Handover with PSCell", 3GPP TSG-RAN4 Meeting #98-e, R4-2103673, Feb. 5, 2021 (Feb. 5, 2021).
NEC, "Discussion on PSCell HO", 3GPP TSG-RAN WG4 Meeting #98-e, R4-2101079, Feb. 5, 2021 (Feb. 5, 2021).
International Search Report for Application No. PCT/CN2021/084971, dated Jan. 7, 2022, 4 pages.
First Office Action for Chinese Application No. 2022103202175, dated Mar. 30, 2023, 2 pages.
Patent Search Report for Chinese Patent Appl. No. 2022103202175, dated Mar. 27, 2023, 4 pages including English translation.
Notification of Third Office Action for Chinese Patent Appl. No. 2022103202175, dated Mar. 1, 2024, 5 pages including English translation.
Patent Search Report for Chinese Patent Appl. No. 2022103202175, dated Dec. 27, 2023, 4 pages including English translation.
Extended European Search Report directed to related European Application No. 21933980.1, mailed Nov. 25, 2024; 10 pages.
Moderator (Apple), "Email discussion summary for [98e] [231] NR_RRM_enh2_1," 3GPP TSG-RAN4 Meeting #98-e, Online, Jan. 25-Feb. 5, 2021, R4-2103470; 56 pages.
Qualcomm CDMA Technologies, "Views on specifying the requirements for HO with PSCell," 3GPP TSG-RAN WG4 Meeting #98-e, R4-2102625, Electronic Meeting, Jan. 25-Feb. 5, 2021, 6 pages.
Xiaomi, "Discussion of RRM requirements for handover with PSCell," 3GPP TSG-RAN 4 Meeting #98e, R4-2100710, E-meeting, Jan. 25-Feb. 5, 2021, 6 pages.
"Universal Mobile Telecommunications System (UMTS);" 3GPP TS 37.340 version 17.7.0 Release 17, Jan. 2024, 122 pages.
"Requirements for support of radio resource management," 3GPP TS 38.133 version 18.6.0 Release 18, Aug. 2024, 5774 pages.

* cited by examiner

1

HANDOVER IN DUAL CONNECTIVITY TO A PRIMARY BASE STATION AND A SECONDARY BASE STATION

This application is a U.S. National Phase of International Application No. PCT/CN2021/084971, filed Apr. 1, 2021, which is hereby incorporated by reference in its entirety.

BACKGROUND

Field

The described aspects generally relate to handover of a user equipment (UE) having dual connectivity to a primary base station and a secondary base station.

Related Art

Wireless mobile communication technology uses various standards and protocols to transmit data between a base station and a wireless mobile device or a user equipment (UE). Wireless communication system standards and protocols can include the 3rd Generation Partnership Project (3GPP) long term evolution (LTE) standard, fifth-generation (5G) 3GPP new radio (NR) standard, and many other standards and protocols. Dual connectivity (DC) is an important feature that can support a UE having two wireless carriers with two different standards and protocols. DC can increase the per-user throughput by improving the utilization of radio resources across two base stations connected via backhaul and operating on different carrier frequencies. In addition, DC can also improve the mobility performance. However, efficient mobility and cell management are needed for DC.

SUMMARY

Some aspects of this disclosure relate to apparatuses and methods for implementing techniques for providing solutions for handover of a user equipment (UE) having dual connectivity to a primary base station and a secondary base station. The implemented techniques can be applicable to many wireless systems, e.g., a wireless communication system based on 3rd Generation Partnership Project (3GPP) release 15 (Rel-15), release 16 (Rel-16), release 17 (Rel-17), or others.

Some aspects of this disclosure relate to a UE. The UE can include a transceiver, and a processor communicatively coupled to the transceiver. The transceiver can be configured to enable wireless communication with a first primary base station in a first primary cell (PCell) and a second primary base station in a second PCell. The UE can have dual connectivity in the second PCell using a first wireless carrier to communicate with the second primary base station and a second wireless carrier to communicate with a secondary base station in a primary secondary cell (PSCell). The processor of the UE is configured to receive a message from the first primary base station to perform a handover procedure to handover the UE from the first primary base station to the second primary base station, and further perform the handover procedure according to the received message. Moreover, the processor is configured to perform an addition procedure for the secondary base station in parallel with the handover procedure. A start time of the addition procedure can be before an end time of the handover procedure. Furthermore, the processor is configured to send, using the transceiver, a first random-access channel (RACH) preamble to the second primary base station at a first time instance, and send a second RACH preamble to the secondary base station at a second time instance.

In some examples, the first time instance is after the end time of the handover procedure, and the second time instance is after an end time of the addition procedure. In some examples, the start time of the addition procedure is a same time instance as a start time of the handover procedure. In some examples, the first time instance is independent from the second time instance. Additionally and alternatively, the second time instance is after the first time instance.

In some examples, the processor is further configured to send an indication to the first primary base station that the UE has a capability to support conducting the handover procedure and the addition procedure in parallel. The processor can be configured to perform other operations, e.g., perform a change procedure for the UE to change the secondary base station. In addition, the processor can be configured to obtain a RACH occasion for sending the second RACH preamble to the secondary base station before the sending the second RACH preamble to the secondary base station. Furthermore, the processor can be configured to receive a Random Access Response (RAR) message from the second primary base station at a third time instance in response to the first RACH preamble sent to the second primary base station at the first time instance. The second time instance can be after the third time instance, which is after the first time instance. Moreover, the processor can be configured to schedule an uplink transmission to the second primary base station for contention based RACH (CBRA) after the third time instance, and receive an acknowledgement from the second primary base station at a fourth time instance. The second time instance can be after the fourth time instance.

Some aspects of this disclosure relate to a method performed by a UE. The UE communicates with a first primary base station in a first PCell and a second primary base station in a second PCell. In addition, the UE has dual connectivity in the second PCell using a first wireless carrier to communicate with the second primary base station and a second wireless carrier to communicate with a secondary base station in a primary secondary cell (PSCell). The method includes receiving a message from the first primary base station to perform a handover procedure to handover the UE from the first primary base station to the second primary base station, and performing the handover procedure according to the received message. Furthermore, the method includes performing an addition procedure for the secondary base station in parallel with the handover procedure, where a start time of the addition procedure is before an end time of the handover procedure. In addition, the method includes sending a first RACH preamble to the second primary base station at a first time instance, and sending a second RACH preamble to the secondary base station at a second time instance. The first time instance is after the end time of the handover procedure, and the second time instance is after an end time of the addition procedure.

Some aspects of this disclosure relate to non-transitory computer-readable medium storing instructions. When executed by a processor of a UE, the instructions stored in the non-transitory computer-readable medium cause the UE to perform various operations. The UE communicates with a first primary base station in a first PCell and a second primary base station in a second PCell. In addition, the UE has dual connectivity in the second PCell using a first wireless carrier to communicate with the second primary base station and a second wireless carrier to communicate with a secondary base station in a primary secondary cell (PSCell). The operations include receiving a message from the first primary base station to perform a handover procedure to handover the UE from the first primary base station to the second primary base station, and performing the handover procedure according to the received message. Furthermore, the operations include performing an addition procedure for the secondary base station in parallel with the handover procedure, where a start time of the addition procedure is before an end time of the handover procedure. In addition, the operations include sending a first RACH preamble to the second primary base station at a first time instance, and sending a second RACH preamble to the secondary base station at a second time instance. The first time instance is after the end time of the handover procedure, and the second time instance is after an end time of the addition procedure.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
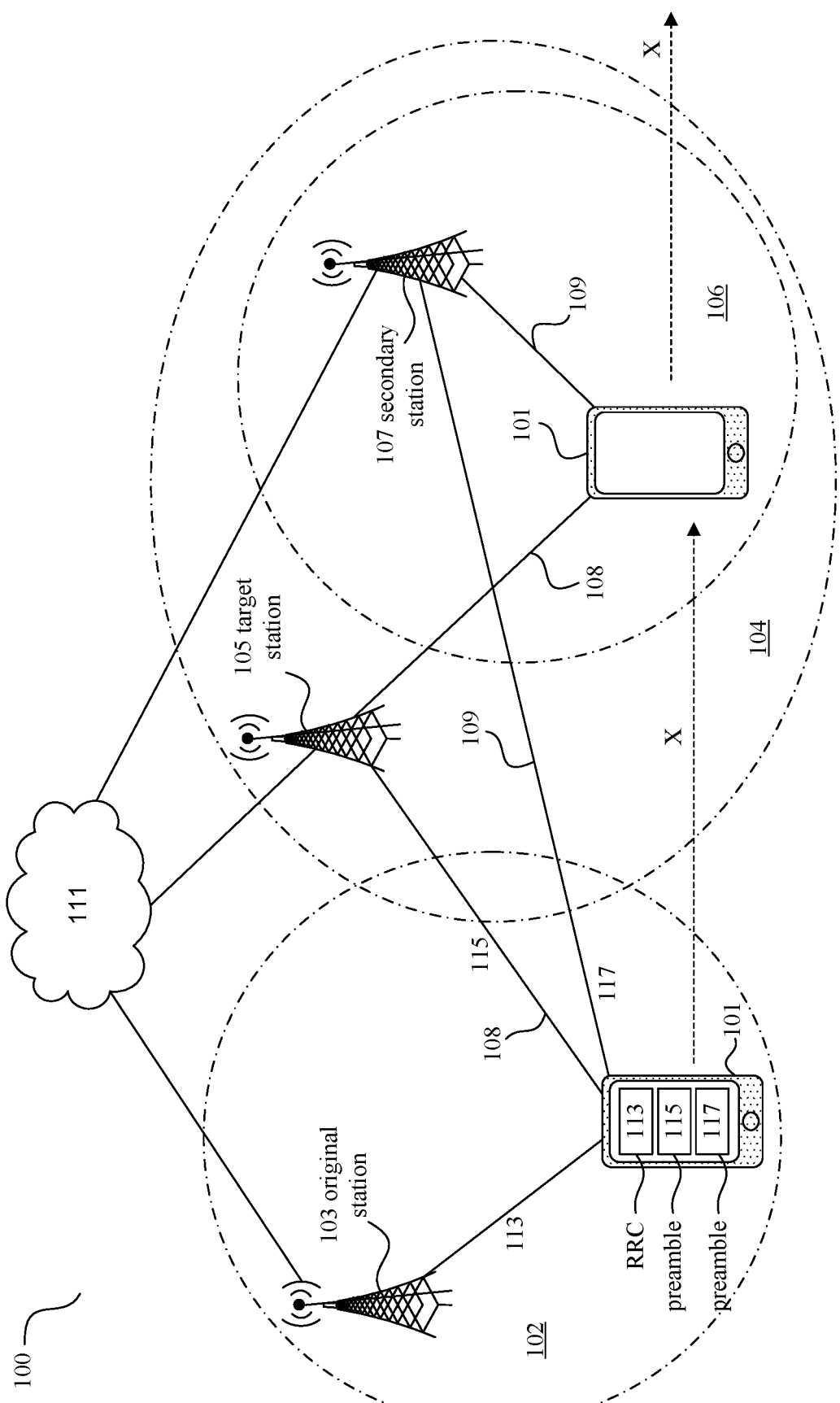
FIG. 1 illustrates a wireless communication system including a user equipment (UE) having dual connectivity to perform handover of the UE to a primary base station and a secondary base station, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Embodiments herein present example solutions by a user equipment (UE) having dual connectivity (DC) to perform handover of the UE to a primary base station and a secondary base station. When a UE of a wireless communication system moves from one location to another, the UE can be served by different base stations, e.g., a first base station, a second base station, a primary base station, a secondary base station, or a combination thereof. The procedure for when a UE is leaving a cell managed by a first base station and entering a cell managed by a second base station can be referred to as a handover procedure to handover the UE from the first base station to the second base station.

Embodiments herein present example handover procedures for a UE having DC. There can be various DCs. For example, there can be dual connectivity of Evolved Universal Mobile Telecommunications System (UMTS) Terrestrial Radio Access (E-UTRA) and new radio (NR) (EN-DC); dual connectivity of NR and E-UTRA (NE-DC); dual connectivity of NR and NR (NR-DC); or other DC. Embodiments herein are applicable to any dual connectivity known to one having the ordinary skills of the art.

Initially, a UE can communicate with a first primary base station in a first primary cell (PCell). The UE may or may not have dual connectivity in the first PCell. The UE may move out of the first PCell and enter a second PCell, where the UE can have dual connectivity in the second PCell using a first wireless carrier to communicate with a second primary base station and a second wireless carrier to communicate with a secondary base station. The secondary base station can be within a primary secondary cell (PSCell). In some embodiments, a PCell can refer to the primary base station within the PCell, while a PSCell can refer to the secondary base station within the PSCell.

According to some aspects, the UE can receive an instruction from the first primary base station in the first PCell for performing a handover procedure. The instruction may be carried by a radio resource control (RRC) message. Based on the received instruction, the UE can perform the handover procedure to handover the UE from the first primary base station to the second primary base station. In addition, even though the instruction may contain only instructions for performing the handover procedure, the UE can perform an addition procedure for the secondary base station in parallel with the handover procedure without further instructions from the first primary base station. Details of the handover procedure and addition procedure are described below. A start time of the addition procedure is before an end time of the handover procedure. Accordingly, the UE can perform operations for two procedures, e.g., the handover procedure and the addition procedure, with one handover instruction. Furthermore, the handover procedure and the addition procedure can be performed in parallel. Therefore, the efficiency for handover of the UE from the first PCell to the second PCell having dual connectivity can be improved. The addition procedure is only an example. The UE can perform other procedures, e.g., a change procedure, in parallel with the handover procedure.

FIG. 1 illustrates a wireless communication system 100 including a UE, e.g., a UE 101, having dual connectivity to perform handover of the UE to a primary base station and a secondary base station, according to some aspects of the disclosure. Wireless communication system 100 is provided for the purpose of illustration only and does not limit the disclosed aspects.

According to some aspects, wireless communication system 100 can include, but is not limited to, UE 101, a base station (BS) 103, a base station 105, and a base station 107, which are communicatively coupled to a core network 111. Base station 103 manages a cell 102, base station 105 manages a cell 104, and base station 107 manages a cell 106. In some examples, base station 103 can be a first primary base station, and cell 102 can be a first PCell; base station 105 can be a second primary base station, and cell 104 can be a second PCell. Base station 107 can be a secondary base station, and cell 106 can be a PSCell. In some other examples, a primary base station can be referred to as other names known to one having ordinary skills in the art.

Initially, UE 101 can communicate with base station 103, which can be a first primary base station within cell 102. When UE 101 moves along the direction X, UE 101 can establish dual connectivity in cell 104 using a first wireless carrier 108 to communicate with base station 105, which may be a second primary base station, and a second wireless carrier 109 to communicate with base station 107, which may be a secondary base station. In order to establish the dual connectivity in cell 104 for UE 101, UE 101 may perform a handover procedure to communicate with base station 105 to replace base station 103. In addition, an addition procedure may be performed so that UE 101 can communicate with base station 107. When UE 101 continues to move along X direction, and out of cell 106 covered by base station 107 to enter the coverage area of another secondary base station, a change procedure may be performed so that UE 101 can stop communicating with base station 107 and start communicating with another secondary base station.

In some examples, wireless communication system 100 can be a wireless system including dual connectivity having two different wireless technologies, e.g., NR, LTE, 5G, some other wireless technology, or a combination thereof. Even though many examples are described herein in the context of NR or LTE technologies, wireless communication system 100 is not limited to such technologies. Instead, wireless communication system 100 can be any communication system that can perform handover of a UE to a primary base station and a secondary base station for the UE having dual connectivity. There can be other network entities, e.g., a network controller, a relay station, in wireless communication system 100 that are not shown, but will be understood by those skilled in the art. Wireless communication system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, base station 103, base station 105, and base station 107 can be a fixed station or a mobile station. Base station 103, base station 105, and base station 107 can also be called other names, such as a base transceiver system (BTS), an access point (AP), a transmission/reception point (TRP), an evolved NodeB (eNB), a next generation node B or a new radio node B (gNB), a next generation evolved Node B (ng-eNB), a 5G node B (NB), or other equivalent terminology as will be understood by those skilled in art. In some examples, base station 103, base station 105, and base station 107 can be interconnected to one another and/or to other base stations or network nodes in a network through various types of backhaul interfaces such as a direct physical connection, wireless connection, a virtual network, and/or the like.

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, within cell 102, UE 101 can be served by new radio (NR) standalone (SA), long term evolution (LTE), E-UTRA and new radio DC (EN-DC), new radio-E-UTRA DC (NE-DC), or new radio DC (NR-DC).

According to some aspects, UE 101 can establish dual connectivity in cell 104 using a first wireless carrier 108 to communicate with base station 105 and a second wireless carrier 109 to communicate with base station 107. The dual connectivity for UE 101 in cell 104 can be EN-DC, NE-DC, NR-DC, or any other DC known to one having ordinary skills of the art. Accordingly, the first wireless carrier 108 can be operated using LTE, NR, E-UTRA, or any other wireless technology, while the second wireless carrier 109 can be operated using LTE, NR, E-UTRA, or any other wireless technology. The handover from base station 103 in cell 102 to the DC in cell 104 can be a handover from NR SA to EN-DC, EN-DC to EN-DC, NE-DC to NE-DC, NR-DC to NR-DC, or some other DC handover.

According to some aspects, UE 101 can receive a message 113 from base station 103 to perform a handover procedure to handover UE 101 from base station 103 to base station 105. In some examples, the instruction may be carried by a RRC message. According to message 113. UE 101 can perform the handover procedure to handover UE 101 from base station 103 to base station 105, and perform an addition procedure for base station 107 in parallel with the handover procedure. A start time of the addition procedure can be before an end time of the handover procedure. For example, the start time of the addition procedure can be a same time instance as a start time of the handover procedure. In addition, UE 101 can send an indication to base station 103 to indicate that UE 101 has a capability to support conducting the handover procedure and the addition procedure in parallel. In some examples, the indication is further configured as per-UE indication, per-band combination (BC) indication, or per band per BC indication. Details of the handover procedure and addition procedure are described below. Once the handover is complete, the UE 101 can further perform a change procedure for UE 101 to change base station 107 to another base station while maintaining DC with base station 105.

In some examples, the handover procedure performed by UE 101 can include one or more operations of automatic gain control (AGC) settling of the second PCell, downlink cell synchronization of the second PCell, time/frequency (T/F) tracking for the second PCell, software processing or radio frequency (RF) warm up, synchronization signal block (SSB) processing, primary synchronization signal (PSS)/secondary synchronization signal (SSS) detection, or some other operations.

In some examples, the addition procedure for base station 107 can include one or more operations of AGC settling of the PSCell, downlink cell synchronization of the PSCell, T/F tracking for the PSCell, software processing or RF warm up, SSB processing, or PSS/SSS detection.

According to some aspects, UE 101 can send a first random-access channel (RACH) preamble 115 to base station 105 at a first time instance, and send a second RACH preamble 117 to base station 107 at a second time instance. RACH is the procedure where UE 101 wants to create an initial connection with the base station. In some examples, UE 101 can obtain a RACH occasion for sending the second RACH preamble 117 to base station 107 before sending the second RACH preamble 117. In some examples, the first time instance is after the end time of the handover procedure, and the second time instance is after an end time of the addition procedure. In some examples, the first time instance can be independent from the second time instance. In some other examples, the second time instance can be after the first time instance.

According to some aspects, UE 101 can further receive a Random Access Response (RAR) message from base station 105 at a third time instance in response to the first RACH preamble 115 sent to base station 105 at the first time instance. In some examples, the second time instance is after the third time instance, which is after the first time instance.

According to some aspects, UE 101 can further schedule an uplink transmission to base station 105 for contention based RACH (CBRA) after the third time instance, and receive an acknowledgement from base station 105 at a fourth time instance, where the second time instance is after the fourth time instance.

Figure 2:
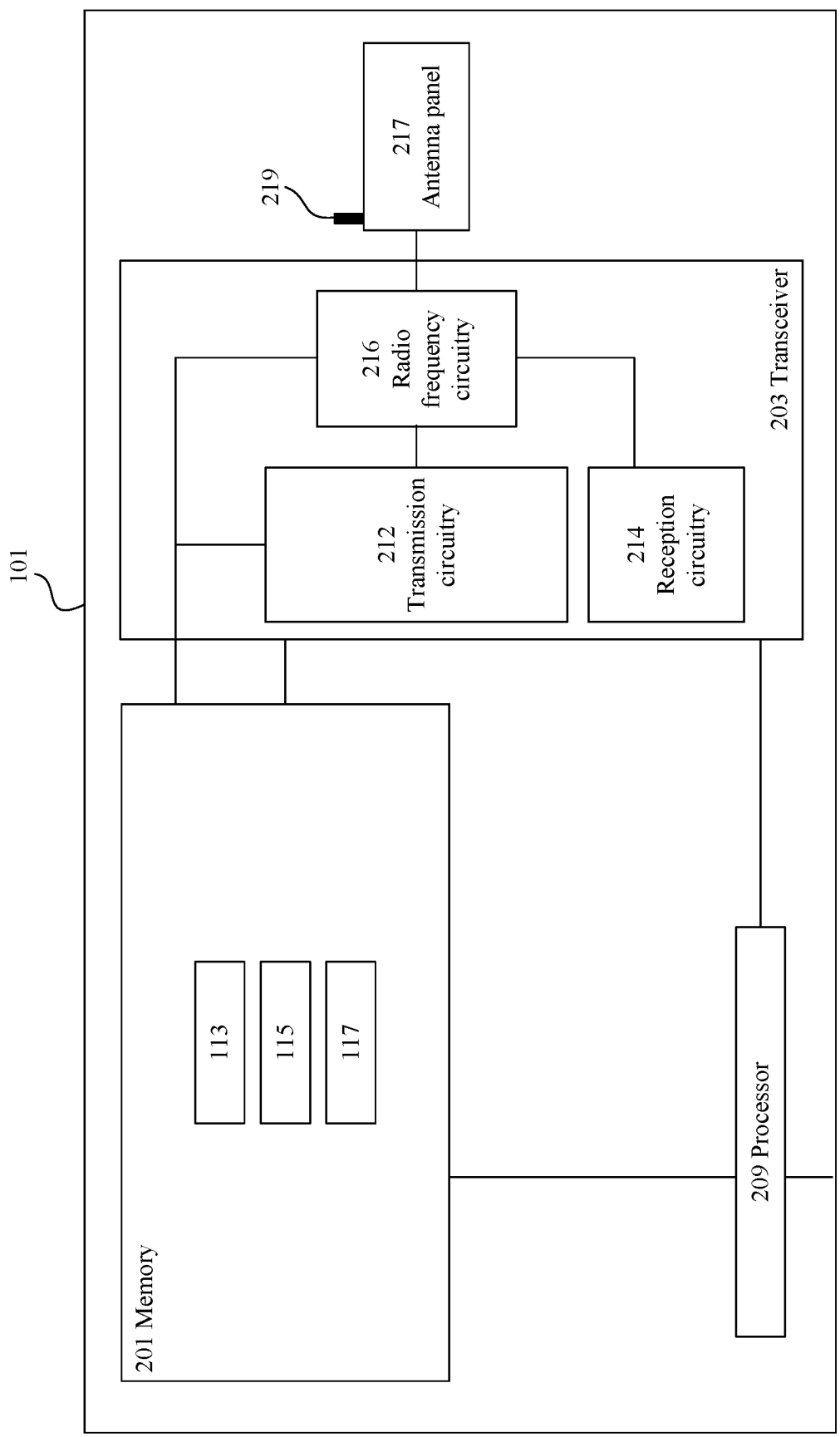
FIG. 2 illustrates a block diagram of a UE to perform functions described herein, according to some aspects of the disclosure.

According to some aspects, UE 101 can be implemented according to a block diagram as illustrated in FIG. 2. UE 101 can have antenna panel 217 including one or more antenna elements to form various antenna beams, e.g., beam 219, coupled to a transceiver 203 and controlled by a processor 209. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 209 can be communicatively coupled to a memory device 201, which are further coupled to the transceiver 203. Various data can be stored in memory device 201. In some examples, memory device 201 can store message 113, the first RACH preamble 115, and the second RACH preamble 117, described above. Memory device 201 can include instructions, that when executed by the processor 209 perform handover procedure and addition procedure related functions described herein. Alternatively, the processor 209 can be "hard-coded" to perform the location related functions described herein.

Figure 3:
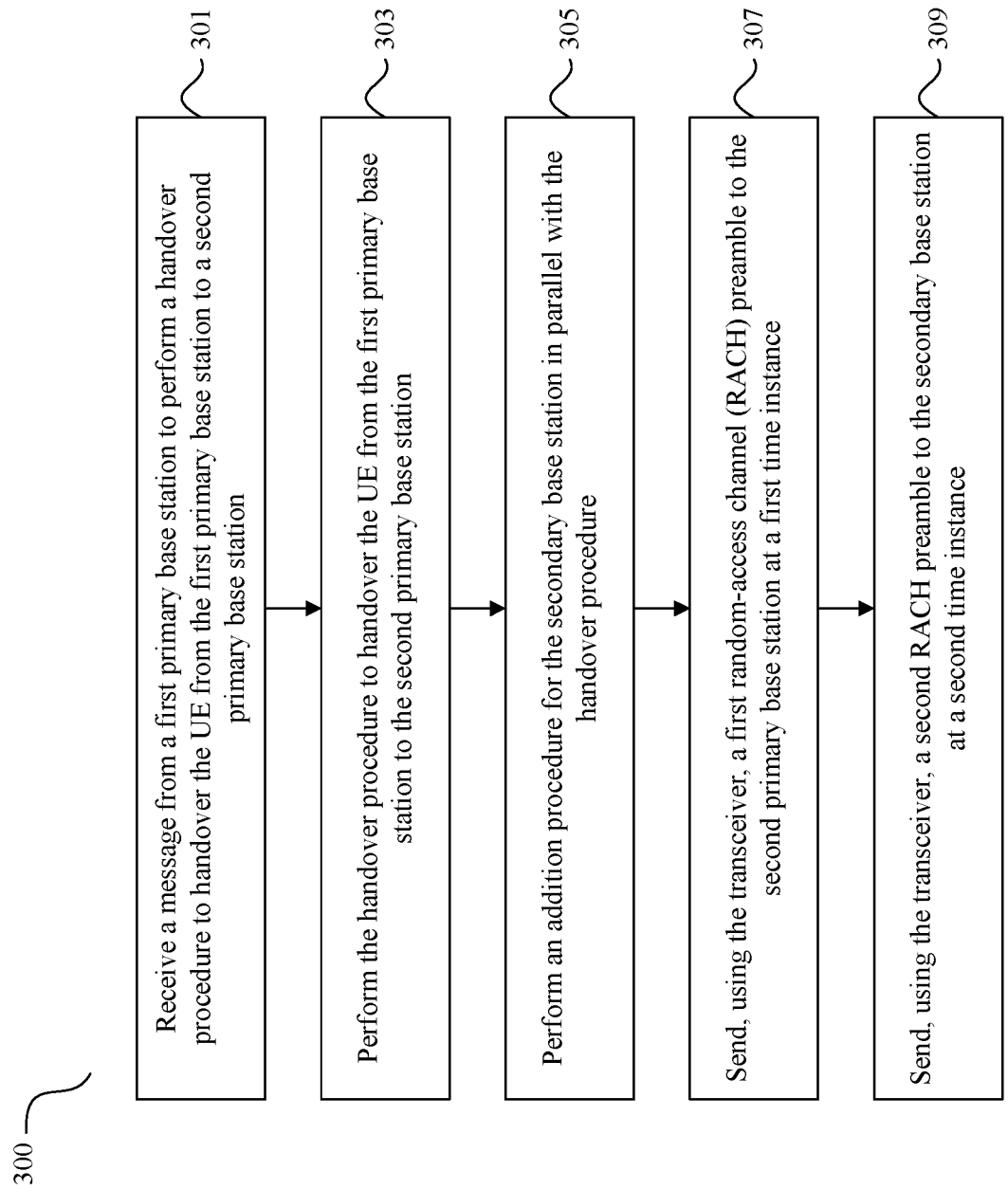
FIG. 3 illustrates an example method performed by a UE having dual connectivity to perform handover of the UE to a primary base station and a secondary base station, according to some aspects of the disclosure.

FIG. 3 illustrates an example method 300 performed by a UE having dual connectivity to perform handover of the UE to a primary base station and a secondary base station, according to some aspects of the disclosure. Method 300 can be performed by (or controlled by) processor 209 in coordination with other components of UE 101. More specifically, processor 209 can execute instructions stored in memory 201 to perform the operations described below for UE 101, or processor 209 can be "hard-coded" to perform operations described below for UE 101.

At 301, UE 101 can receive a message from a first primary base station to perform a handover procedure to handover the UE from the first primary base station to a second primary base station. UE 101 communicates with the first primary base station in a first PCell and the second primary base station in a second PCell. UE 101 has dual connectivity in the second PCell using a first wireless carrier to communicate with the second primary base station and a second wireless carrier to communicate with a secondary base station in a PSCell. For example, UE 101 can receive a RRC message, e.g., message 113, from base station 103 in a first PCell, e.g., cell 102. According to message 113, UE 101 is to perform a handover procedure to handover UE 101 from the first primary base station, e.g., base station 103 within cell 102, to a second primary base station, e.g., base station 105 within cell 104. UE 101 has dual connectivity in the second PCell, e.g., cell 104, using the first wireless carrier 108 to communicate with the base station 105 and the second wireless carrier 109 to communicate with base station 107.

At 303, UE 101 can perform the handover procedure to handover UE 101 from the first primary base station to the second primary base station. For example, UE 101 can perform the handover procedure to handover UE 101 from base station 103 to base station 105.

At 305, UE 101 can perform an addition procedure for the secondary base station in parallel with the handover procedure, where a start time of the addition procedure is before an end time of the handover procedure. For example, UE 101 can perform an addition procedure for base station 107 in parallel with the handover procedure. A start time of the addition procedure can be before an end time of the handover procedure.

At 307, UE 101 can send a first RACH preamble to the second primary base station at a first time instance, where the first time instance is after the end time of the handover procedure. For example, UE 101 can send the first RACH preamble 115 to the second primary base station, e.g., base station 105, at a first time instance, where the first time instance is after the end time of the handover procedure.

At 309, UE 101 can send a second RACH preamble to the secondary base station at a second time instance, where the second time instance is after an end time of the addition procedure. For example, UE 101 can send the second RACH preamble 117 to the secondary base station, e.g., base station 107, at a second time instance.

FIGS. 4A-4D illustrate example methods, e.g., method 410, method 420, method 430, and method 440, performed by UE 101 having dual connectivity to perform handover of the UE to a primary base station and a secondary base station, according to some aspects of the disclosure. Method 410, method 420, method 430, and method 440 can be performed by processor 209 of UE 101, as described above. Method 410, method 420, method 430, and method 440 are all examples of method 300 shown in FIG. 3, with different implementation details.

Figure 4A:
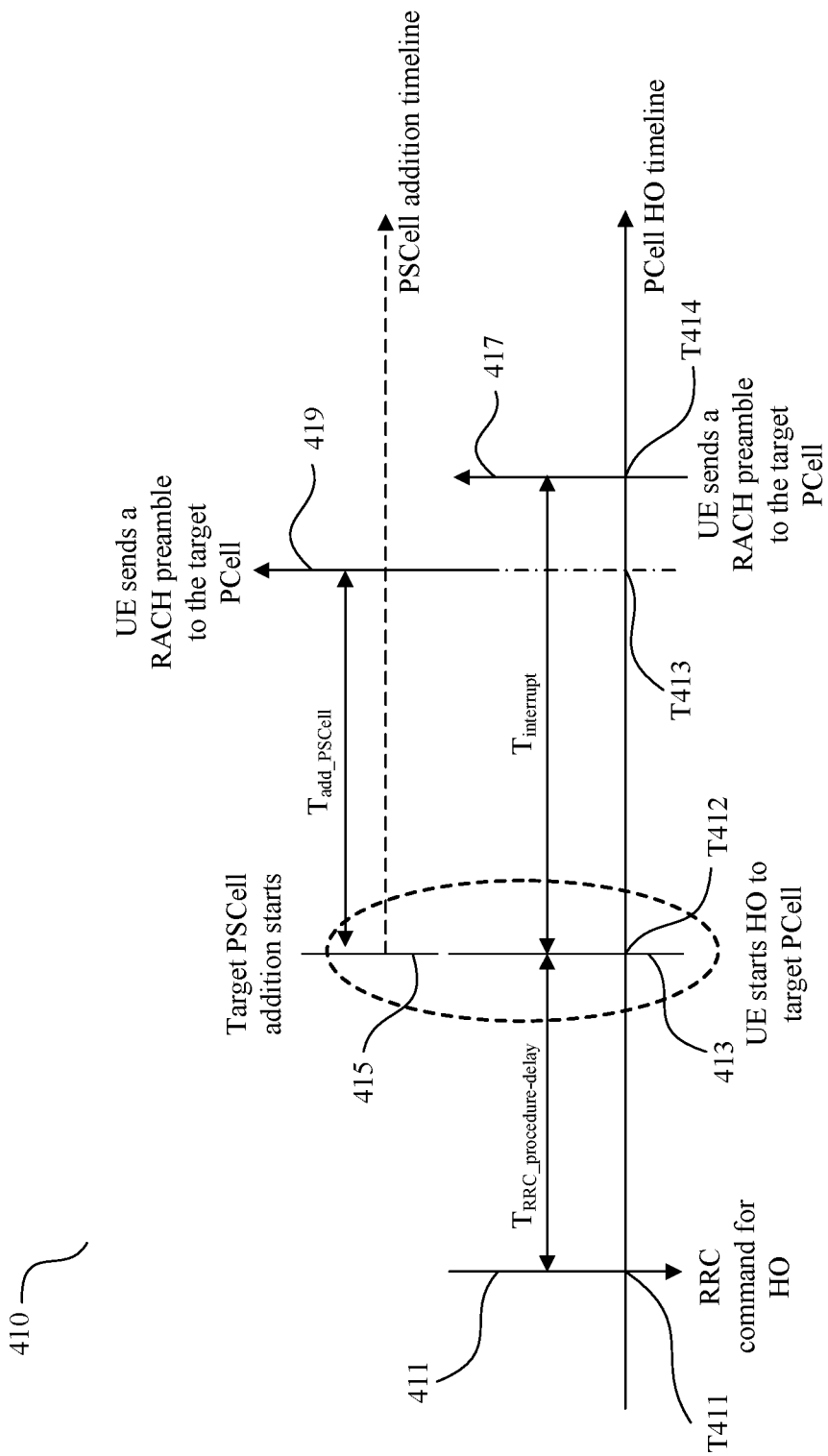
FIGS. 4A-4D illustrate example methods performed by a UE having dual connectivity to perform handover of the UE to a primary base station and a secondary base station, according to some aspects of the disclosure.

Method 410 is shown in FIG. 4A. FIG. 4A shows operations performed along two parallel timelines. PSCell addition timeline showing the operations to be performed for the secondary base station, and PCell handover timeline showing the operations to be performed for the handover of UE 101 from the first primary base station to the second primary base station. Operations are marked to be performed at various time instance.

At time instance T411, at 411, UE 101 can perform operations to receive a RRC message including a command to perform a handover procedure. Operations performed at 411 may be similar to operations performed at 301 of method 300 shown in FIG. 3.

At time instance T412, UE 101 has finished processing the RRC message. The time delay between time instance T411 and T412 is denoted as $T_{RRC\text{-}procedure\text{-}delay}$, which is long enough for UE 101 to finish processing the RRC message, and identify the command or instruction for performing the handover procedure. In some examples, $T_{RRC\text{-}procedure\text{-}delay}$ can also include a time period for waiting for a RACH occasion.

At time instance T412, at 413, UE 101 can start the handover procedure to handover the UE 101 to the target PCell, e.g., to handover UE 101 from base station 103 to base station 105. Operations performed at 413 may be similar to operations performed at 303 shown in FIG. 3.

At time instance T412, at 415, target PSCell addition starts. For example, operations may be performed for the addition procedure for base station 107 so that base station 107 can serve UE 101. Operations performed at 415 may be similar to operations performed at 305 shown in FIG. 3. FIG. 4A shows that operations at 413 and operations at 415 are performed at the same time. In some other examples, they can have different start time. For example, the operations at 415 for the addition procedure can start after the start of the handover operations at 413.

At time instance T413, operations for target PSCell addition have been completed. The time gap between time instance T412 and time instance T413 is denoted as $T_{add\_PSCell}$, which includes at least the time to complete the target PSCell addition procedure. At the same time, at 419, UE 101 can send a RACH preamble to the target PSCell. For example, UE 101 can send the second RACH preamble 117 to base station 107. Operations performed at 419 may be similar to operations performed at 309 shown in FIG. 3.

At time instance T414, operations for the handover procedure to handover the UE 101 to the target PCell have been completed. The time gap between time instance T412 and time instance T414 is denoted as $T_{Interrupt}$. At the same time, at 417, UE 101 can send a RACH preamble to the target PCell. For example, UE 101 can send the first RACH preamble 115 to base station 105. Operations performed at 417 may be similar to operations performed at 307 shown in FIG. 3.

As shown in FIG. 4A, operations at 419 to send a RACH preamble to the target PSCell and operations at 417 to send a RACH preamble to the target PCell are performed independently, without a limitation on the time order between the two events. As shown in FIG. 4A, operations at 419 are performed at time instance T413, which is earlier than time instance T414. In some other embodiments, operations at 419 can be performed later than time instance T414 when operations at 417 are performed.

As shown in FIG. 4A, the total time used to complete the operations shown in FIG. 4A can be denoted as $T_{handover+addition} = T_{RRC\text{-}procedure\text{-}delay} + \max\{T_{Interrupt}, T_{add\_Pscell}\}$. $T_{RRC\text{-}procedure\text{-}delay}$ is the RRC message processing time for handover between primary base stations, which is similar to conventional handover time without dual connectivity. $T_{Interrupt}$ is the time for completing the handover procedure to handover the UE 101 to the target PCell, e.g., base station 105. $T_{add\_PSCell}$ is the time for completing the target PSCell addition procedure, e.g., performing the addition procedure for base station 107. Both $T_{add\_PSCell}$ and $T_{Interrupt}$ may include a time waiting for a RACH occasion. $T_{add\_PSCell}$ can include the time to perform operations such as automatic gain control (AGC) settling of the PSCell, downlink cell synchronization of the PSCell, time/frequency (T/F) tracking for the PSCell, software processing or radio frequency (RF) warm up, synchronization signal block (SSB) processing, or primary synchronization signal (PSS)/secondary synchronization signal (SSS) detection. Similarly, $T_{Interrupt}$ can include the time to perform operations such as AGC settling of the second PCell, downlink cell synchronization of the second PCell, T/F tracking for the second PCell, software processing or RF warm up, SSB processing, or PSS/SSS detection.

Figure 4B:
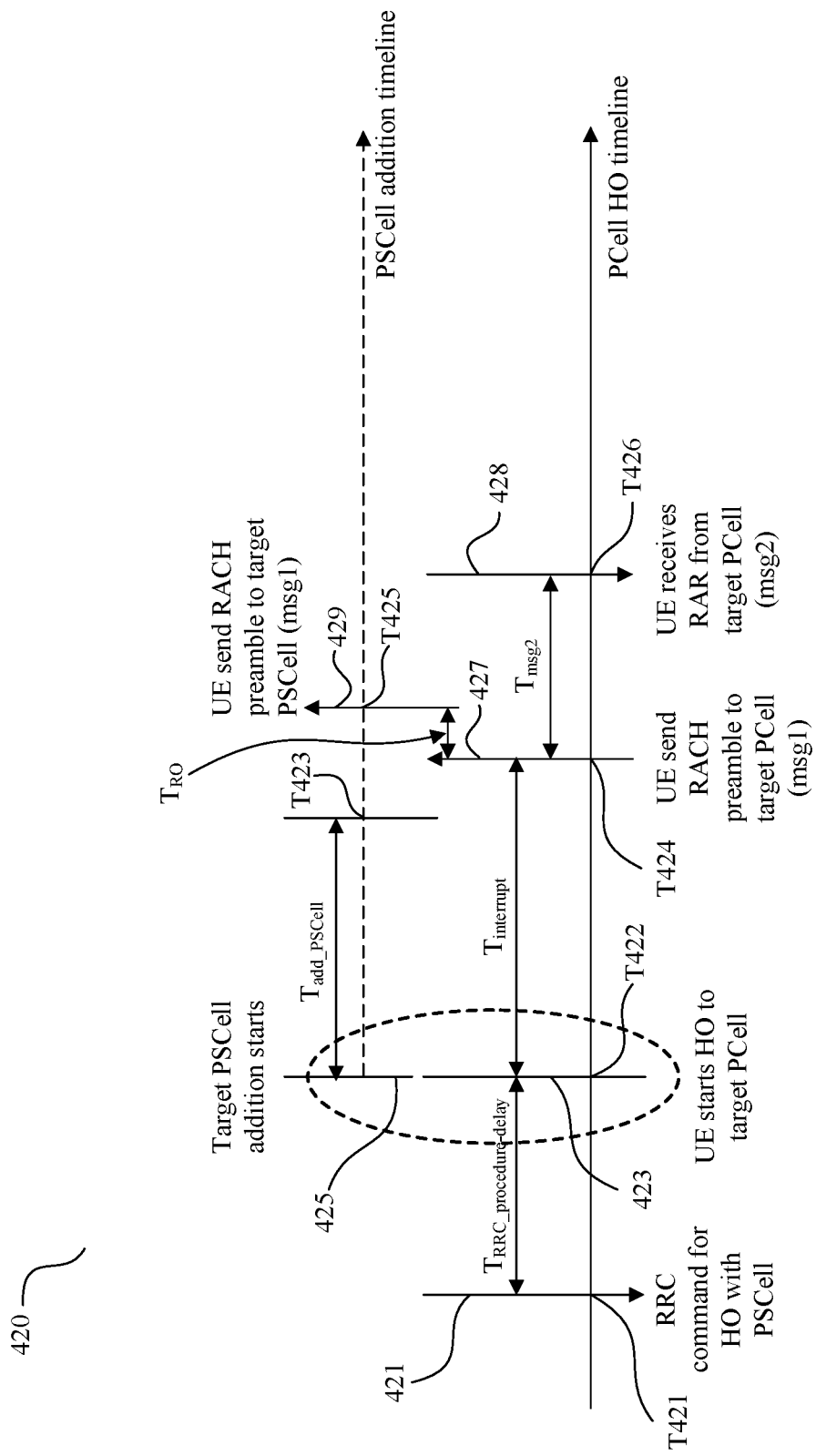

Similar to method 410, method 420 in FIG. 4B shows operations performed along two parallel timelines. PSCell addition timeline showing the operations to be performed for the secondary base station, and PCell handover timeline showing the operations to be performed for handover UE 101 from the first primary base station to the second primary base station.

At time instance T421, at 421, UE 101 can perform operations to receive a RRC message including a command to perform a handover procedure. Operations performed at 421 may be similar to operations performed at 301 of method 300 shown in FIG. 3. At time instance T422. UE 101 has finished processing the RRC message after time delay $T_{RRC\text{-}procedure\text{-}delay}$.

At time instance T422, at 423, UE 101 can start the handover procedure to handover the UE 101 to the target PCell, e.g., to handover UE 101 from base station 103 to base station 105. Operations performed at 423 may be similar to operations performed at 303 shown in FIG. 3.

At time instance T422, at 425, target PSCell addition starts. For example, operations may be performed for the addition procedure for base station 107 so that base station 107 can serve UE 101. Operations performed at 425 may be similar to operations performed at 305 shown in FIG. 3. FIG. 4B shows that operations at 423 and operations at 425 are performed at the same time. In some other examples, they can have different start time. At time instance T423, operations for target PSCell addition have been completed. The time gap between time instance T422 and time instance T423 is denoted as $T_{add\_PSCell}$, which includes at least the time to complete the target PSCell addition procedure. At time instance T424, operations for the handover procedure to handover the UE 101 to the target PCell have been completed after a time gap of $T_{interrupt}$.

At time instance T424, at 427, UE 101 can send a RACH preamble to the target PCell. For example, UE 101 can send the first RACH preamble 115 to base station 105. Operations performed at 427 may be similar to operations performed at 307 shown in FIG. 3. UE 101 further waits for a time period $T_{RO}$ for the next available RACH to PSCell, which is available at time instance T425.

At time instance T425, at 429, UE 101 can send a RACH preamble to the target PSCell. For example, UE 101 can send the second RACH preamble 117 to base station 107. Operations performed at 429 may be similar to operations performed at 309 shown in FIG. 3.

Furthermore, at time instance T426, at 428, UE 101 can receive a Random Access Response (RAR) message from the target PCell in response to the RACH preamble sent to PCell. For example, UE 101 can receive a RAR message from base station 105 in response to the first RACH preamble 115 sent to base station 105. A time gap between T424 and T426 can be denoted as $T_{msg2}$.

As shown in FIG. 4B, the total time used to complete the operations shown in FIG. 4A can be denoted as $T_{handover+addition} = T_{RRC\text{-}procedure\text{-}delay} + \max\{T_{Interrupt}, T_{add\_PSCell}\} + T_{RO}$.

Figure 4C:
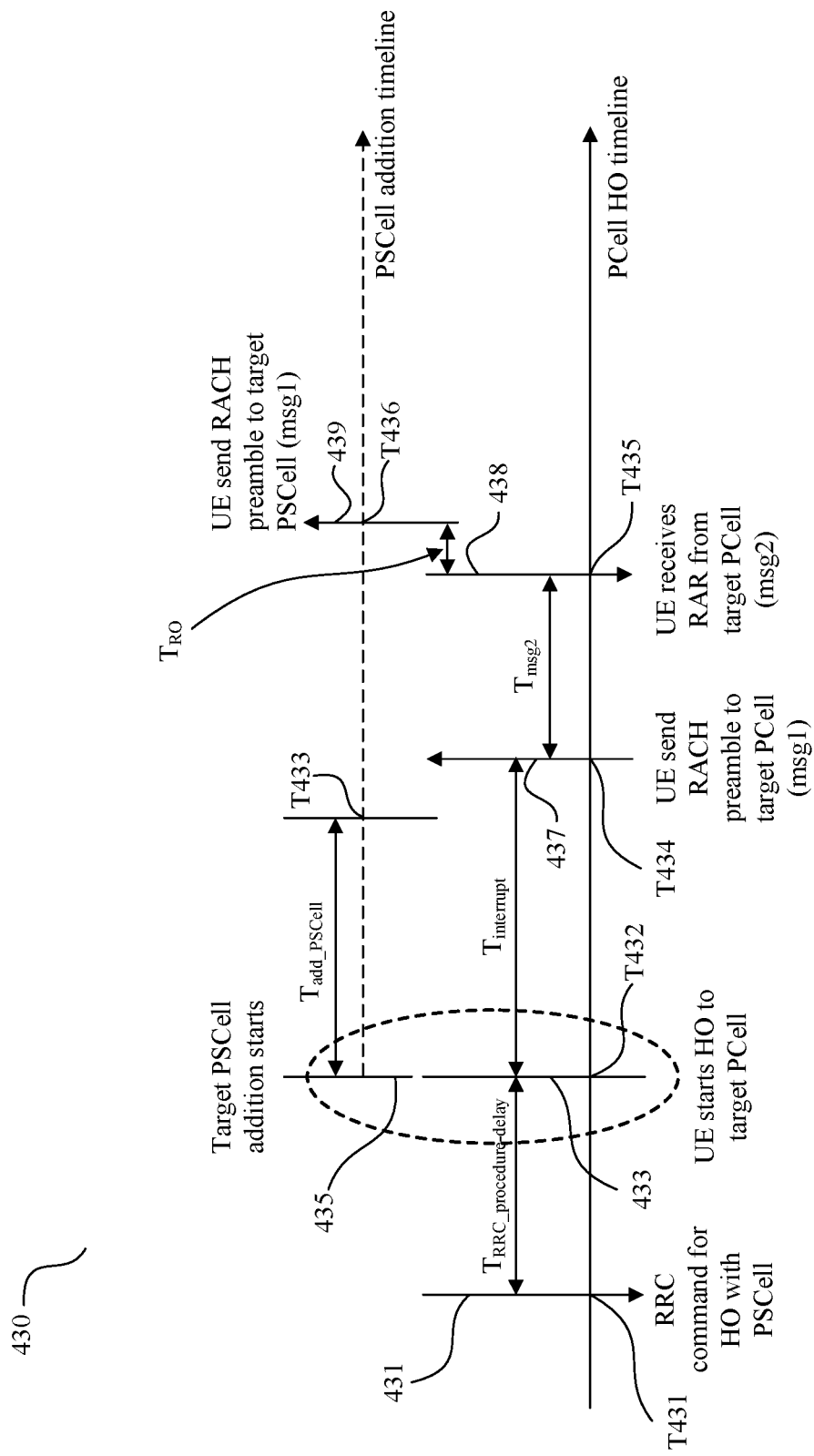

Similar to method 410, method 430 in FIG. 4C shows operations performed along two parallel timelines, PSCell addition timeline showing the operations to be performed for the secondary base station, and PCell handover timeline showing the operations to be performed for handover UE 101 from the first primary base station to the second primary base station.

At time instance T431, at 431, UE 101 can perform operations to receive a RRC message including a command to perform a handover procedure. Operations performed at 431 may be similar to operations performed at 301 of method 300 shown in FIG. 3. At time instance T432, UE 101 has completed processing the RRC message after time delay $T_{RRC\text{-}procedure\text{-}delay}$.

At time instance T432, at 433, UE 101 can start the handover procedure to handover the UE 101 to the target PCell, e.g., to handover UE 101 from base station 103 to base station 105. Operations performed at 433 may be similar to operations performed at 303 shown in FIG. 3.

At time instance T432, at 435, target PSCell addition starts. For example, operations may be performed for the addition procedure for base station 107 so that base station 107 can serve UE 101. Operations performed at 435 may be similar to operations performed at 305 shown in FIG. 3. FIG. 4C shows that operations at 433 and operations at 435 are performed at the same time. In some other examples, they can have different start time. At time instance T433, operations for target PSCell addition have been completed. The time gap between time instance T432 and time instance T433 is denoted as $T_{add\_PSCell}$, which includes at least the time to complete the target PSCell addition procedure. At time instance T434, operations for handover procedure to handover the UE 101 to the target PCell have been completed after a time gap of $T_{interrupt}$.

At time instance T434, at 437, UE 101 can send a RACH preamble to the target PCell. For example, UE 101 can send the first RACH preamble 115 to base station 105. Operations performed at 437 may be similar to operations performed at 307 shown in FIG. 3. Furthermore, at time instance T435, at 438, UE 101 can receive a RAR message from the target PCell in response to the RACH preamble sent to PCell. For example, UE 101 can receive a RAR message from base station 105 in response to the first RACH preamble 115 sent to base station 105. The time gap between time instance T434 and time instance T435 can be $T_{msg2}$. UE 101 further waits for a time period $T_{RO}$ for the next available RACH to PSCell, which is available at T436.

At time instance T436, at 439, UE 101 can send a RACH preamble to the target PSCell. For example, UE 101 can send the second RACH preamble 117 to base station 107. Operations performed at 439 may be similar to operations performed at 309 shown in FIG. 3.

As shown in FIG. 4C, the total time used to complete the operations shown in FIG. 4A can be denoted as $T_{handover+addition} = T_{RRC\text{-}procedure\text{-}delay} + \max\{T_{Interrupt} + T_{msg2}, T_{add\_PSCell}\} + T_{RO}$.

Figure 4D:
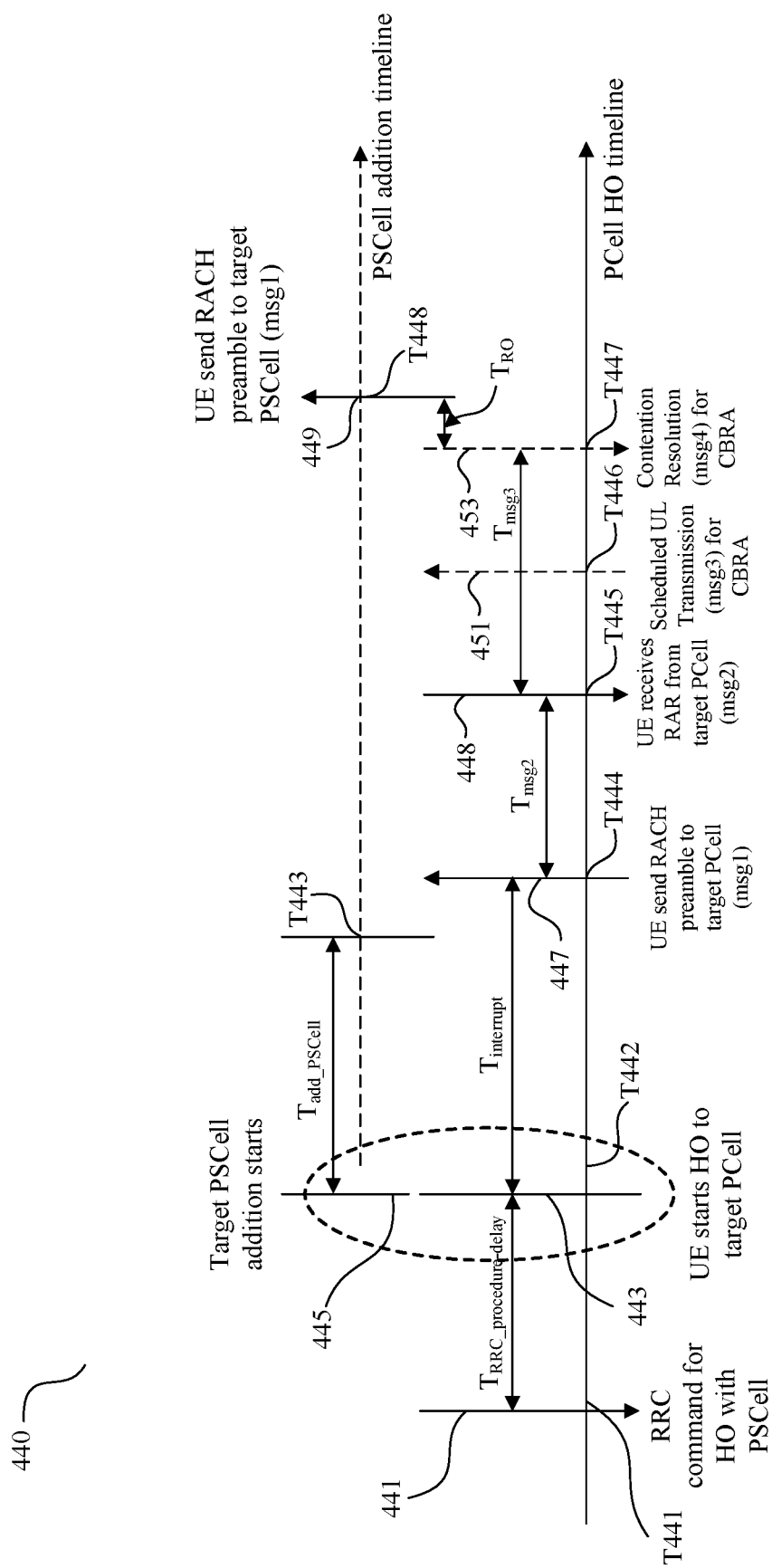

Similar to method 410, method 440 in FIG. 4D shows operations performed along two parallel timelines, PSCell addition timeline showing the operations to be performed for the secondary base station, and PCell handover timeline showing the operations to be performed for handover UE 101 from the first primary base station to the second primary base station.

At time instance T441, at 441, UE 101 can perform operations to receive a RRC message including a command to perform a handover procedure. Operations performed at 441 may be similar to operations performed at 301 of method 300 shown in FIG. 3. At time instance T442, UE 101 has completed processing the RRC message after time delay $T_{RRC\text{-}procedure\text{-}delay}$.

At time instance T442, at 443. UE 101 can start the handover procedure to handover the UE 101 to the target PCell, e.g., to handover UE 101 from base station 103 to base station 105. Operations performed at 443 may be similar to operations performed at 303 shown in FIG. 3.

At time instance T442, at 445, target PSCell addition starts. For example, operations may be performed for the addition procedure for base station 107 so that base station 107 can serve UE 101. Operations performed at 445 may be similar to operations performed at 305 shown in FIG. 3. FIG. 4D shows that operations at 443 and operations at 445 are performed at the same time. In some other examples, they can have different start time. At time instance T443, operations for target PSCell addition have been completed. The time gap between time instance T442 and time instance T443 is denoted as $T_{add\_PSCell}$, which includes at least the time to complete the target PSCell addition procedure. At time instance T444, operations for handover procedure to handover the UE 101 to the target PCell have been completed after a time gap of $T_{interrupt}$.

At time instance T444, at 447, UE 101 can send a RACH preamble to the target PCell. For example, UE 101 can send the first RACH preamble 115 to base station 105. Operations performed at 447 may be similar to operations performed at 307 shown in FIG. 3. Furthermore, at time instance T445, at 448, UE 101 can receive a RAR message from the target PCell in response to the RACH preamble sent to PCell. For example, UE 101 can receive a RAR message from base station 105 in response to the first RACH preamble 115 sent to base station 105. The time gap between time instance T444 and time instance T445 can be $T_{msg2}$.

At time instance T446, at 451, UE 101 can schedule an uplink transmission to the second primary base station for contention based RACH (CBRA). At time instance T447, at 453, UE 101 can receive an acknowledgement from the second primary base station at a fourth time instance. A time gap between time instance T445 and time instance T447 can be $T_{msg4}$. After time instance T447, UE 101 further waits for a time period $T_{RO}$ for the next available RACH to PSCell, which is available at T448.

At time instance T448, at 449, UE 101 can send a RACH preamble to the target PSCell. For example, UE 101 can send the second RACH preamble 117 to base station 107. Operations performed at 449 may be similar to operations performed at 309 shown in FIG. 3.

Figure 5:
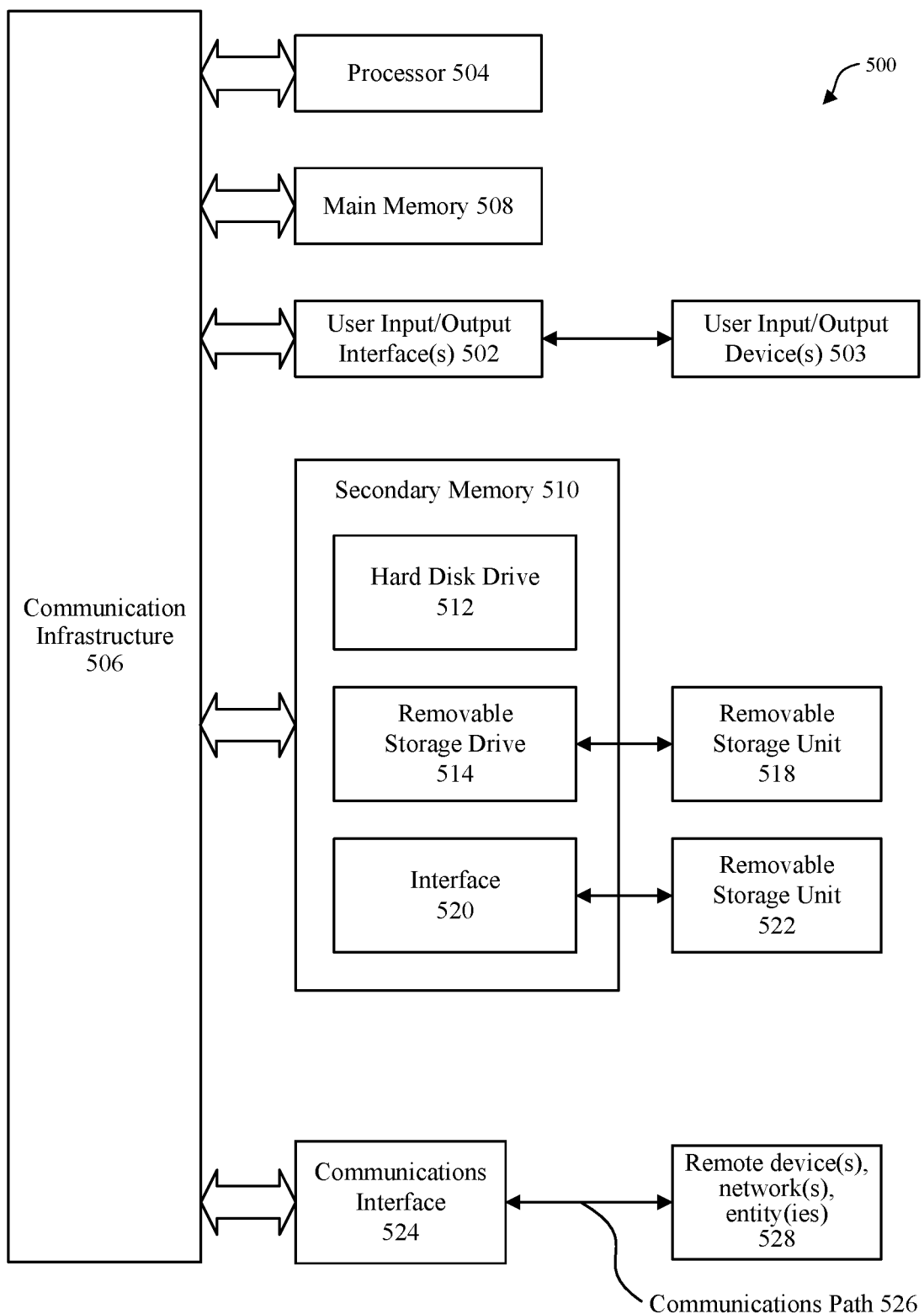
FIG. 5 is an example computer system for implementing some aspects or portion(s) thereof of the disclosure provided herein.

As shown in FIG. 4D, the total time used to complete the operations shown in FIG. 4A can be denoted as $T_{handover+addition} = T_{RRC\text{-}procedure\text{-}delay} + \max\{T_{Interrupt} + T_{msg2} + T_{msg4}, T_{add\_PSCell}\} + T_{RO}$ Various aspects can be implemented, for example, using one or more computer systems, such as computer system 500 shown in FIG. 5. Computer system 500 can be any computer capable of performing the operations described herein such as UE 101, base station 103, base station 105, base station 107, as shown in FIGS. 1-2, and operations described in FIG. 3 and FIGS. 4A-4D. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE or a base station, e.g., UE 101, base station 103, base station 105, base station 107, as shown in FIGS. 1-2, and operations described in FIG. 3 and FIGS. 4A-4D.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526. Operations of the communication interface 524 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
a transceiver configured to enable wireless communication with a first primary base station in a first primary cell (PCell) and a second primary base station in a second PCell, wherein the UE has dual connectivity in the second PCell using a first wireless carrier to communicate with the second primary base station and a second wireless carrier to communicate with a secondary base station in a primary secondary cell (PSCell); and
a processor communicatively coupled to the transceiver and configured to:
receive a message from the first primary base station to perform a handover procedure to handover the UE from the first primary base station to the second primary base station;
perform the handover procedure to handover the UE from the first primary base station to the second primary base station;
perform an addition procedure for the secondary base station in parallel with the handover procedure, wherein a start time of the addition procedure is before an end time of the handover procedure and after a start time of the handover procedure;
send, using the transceiver, a first random-access channel (RACH) preamble to the second primary base station at a first time instance, wherein the first time instance is after the end time of the handover procedure;
send, using the transceiver, a second RACH preamble to the secondary base station at a second time instance, wherein the second time instance is after an end time of the addition procedure;
receive a Random Access Response (RAR) message from the second primary base station at a third time instance in response to the first RACH preamble sent to the second primary base station at the first time instance;
schedule an uplink transmission to the second primary base station for a contention based RACH (CBRA) after the third time instance; and
receive an acknowledgement from the second primary base station at a fourth time instance, wherein the second time instance is after the fourth time instance.

2. The UE of claim 1, wherein the processor is further configured to:
perform a change procedure for the UE to change the secondary base station.

3. The UE of claim 1, wherein the processor is further configured to:
obtain a RACH occasion for sending the second RACH preamble to the secondary base station before the sending the second RACH preamble to the secondary base station.

4. The UE of claim 1, wherein the start time of the addition procedure is a same time instance as the start time of the handover procedure.

5. The UE of claim 1, wherein the first time instance is independent from the second time instance.

6. The UE of claim 1, wherein the second time instance is after the first time instance.

7. The UE of claim 1, wherein the second time instance is after the third time instance, which is after the first time instance.

8. The UE of claim 1, wherein the processor is further configured to:
send, using the transceiver, an indication to the first primary base station that the UE has a capability to support conducting the handover procedure and the addition procedure in parallel.

9. The UE of claim 1, wherein the UE is served in the first PCell by long term evolution (LTE), new radio (NR) stand-alone (SA), Evolved Universal Mobile Telecommunications System (UMTS) Terrestrial Radio Access (E-UTRA) and NR dual connectivity (EN-DC), NR and E-UTRA dual connectivity (NE-DC), or NR and NR dual connectivity (NR-DC) technology, and the dual connectivity in the second PCell include the EN-DC, the NE-DC, or the NR-DC.

10. The UE of claim 1, wherein to perform the handover procedure, the processor is configured to perform one or more operations of: automatic gain control (AGC) settling of the second PCell, downlink cell synchronization of the second PCell, time/frequency (T/F) tracking for the second PCell, software processing or radio frequency (RF) warm up, synchronization signal block (SSB) processing, or primary synchronization signal (PSS)/secondary synchronization signal (SSS) detection.

11. The UE of claim 1, wherein to perform the addition procedure, the processor is configured to perform one or more operations of: automatic gain control (AGC) settling of the PSCell, downlink cell synchronization of the PSCell, time/frequency (T/F) tracking for the PSCell, software processing or radio frequency (RF) warm up, synchronization signal block (SSB) processing, or primary synchronization signal (PSS)/secondary synchronization signal (SSS) detection.

12. A method for a user equipment (UE), comprising:
receiving a message from a first primary base station to perform a handover procedure to handover the UE from the first primary base station to a second primary base station, wherein the UE communicates with the first primary base station in a first primary cell (PCell) and the second primary base station in a second PCell, and wherein the UE has dual connectivity in the second PCell using a first wireless carrier to communicate with the second primary base station and a second wireless carrier to communicate with a secondary base station in a primary secondary cell (PSCell);
performing the handover procedure to handover the UE from the first primary base station to the second primary base station;
performing an addition procedure for the secondary base station in parallel with the handover procedure, wherein a start time of the addition procedure is before an end time of the handover procedure and after a start time of the handover procedure;
sending a first random-access channel (RACH) preamble to the second primary base station at a first time instance, wherein the first time instance is after the end time of the handover procedure;
sending a second RACH preamble to the secondary base station at a second time instance, wherein the second time instance is after an end time of the addition procedure;
receiving a Random Access Response (RAR) message from the second primary base station at a third time instance in response to the first RACH preamble sent to the second primary base station at the first time instance;
scheduling an uplink transmission to the second primary base station for a contention based RACH (CBRA) after the third time instance; and
receiving an acknowledgement from the second primary base station at a fourth time instance, wherein the second time instance is after the fourth time instance.

13. The method of claim 12, further comprising:
obtaining a RACH occasion for sending the second RACH preamble to the secondary base station before the sending the second RACH preamble to the secondary base station.

14. The method of claim 12, wherein the second time instance is after the third time instance, which is after the first time instance.

15. A non-transitory computer-readable medium storing instructions that, when executed by a processor of a user equipment (UE), cause the UE to perform operations, the operations comprising:
receiving a message from a first primary base station to perform a handover procedure to handover the UE from the first primary base station to a second primary base station, wherein the UE communicates with the first primary base station in a first primary cell (PCell) and the second primary base station in a second PCell, and wherein the UE has dual connectivity in the second PCell using a first wireless carrier to communicate with the second primary base station and a second wireless carrier to communicate with a secondary base station in a primary secondary cell (PSCell);
performing the handover procedure to handover the UE from the first primary base station to the second primary base station;
performing an addition procedure for the secondary base station in parallel with the handover procedure, wherein a start time of the addition procedure is before an end time of the handover procedure and after a start time of the handover procedure;
sending a first random-access channel (RACH) preamble to the second primary base station at a first time instance, wherein the first time instance is after the end time of the handover procedure;
sending a second RACH preamble to the secondary base station at a second time instance, wherein the second time instance is after an end time of the addition procedure;
receiving a Random Access Response (RAR) message from the second primary base station at a third time instance in response to the first RACH preamble sent to the second primary base station at the first time instance;
scheduling an uplink transmission to the second primary base station for a contention based RACH (CBRA) after the third time instance; and
receiving an acknowledgement from the second primary base station at a fourth time instance, wherein the second time instance is after the fourth time instance.

16. The non-transitory computer-readable medium of claim 15, the operations further comprising:
obtaining a RACH occasion for sending the second RACH preamble to the secondary base station before the sending the second RACH preamble to the secondary base station; and receiving a Random Access Response (RAR) message from the second primary base station at a third time instance in response to the first RACH preamble sent to the second primary base station at the first time instance.

* * * * *